Nov. 15, 1938. F. E. BECKETT 2,136,358
INTERNAL COMBUSTION ENGINE
Filed June 15, 1935
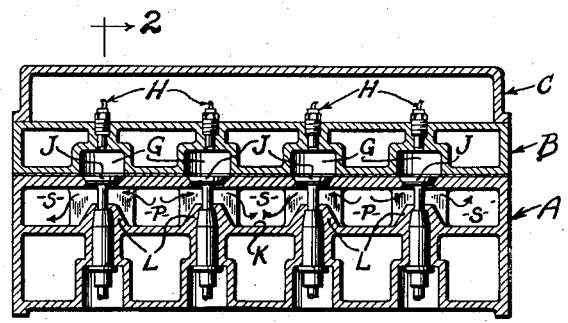
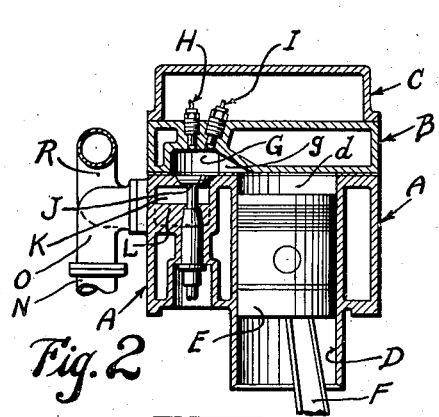
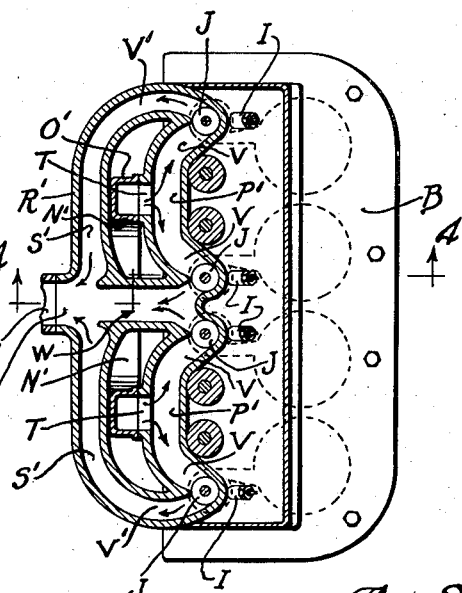
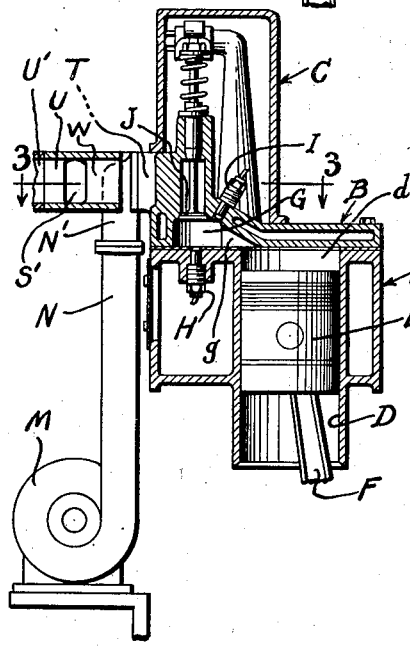
INVENTOR.
Farley. E. Beckett
BY
ATTORNEY.

Patented Nov. 15, 1938

2,136,358

UNITED STATES PATENT OFFICE 2,136,358

INTERNAL COMBUSTION ENGINE

Farley E. Beckett, Inglewood, Calif., assignor of one-half to J. A. Rosenkranz, Los Angeles, Calif.

Application June 15, 1935, Serial No. 26,821

2 Claims. (Cl. 123—79)

This invention has for a principal object the provision of an internal combustion engine of the Diesel type in which a single valve is employed for regulating the intake of air to an associated cylinder and exhausting the products of combustion therefrom, and contemplates the provision of means such as a fan or blower of a suitable form adapted for connection with a novel form of combined intake and exhaust manifold so that the air stream created by the blower operates to charge the cylinders of an engine with air from the atmosphere when the valves are opened on intake cycles and by means of the form and arrangement of the exhaust passages to direct and effect the outward flow of the products of combustion from the cylinders and the combustion chambers when the valves are opened on the exhaust cycles of operation.

Another object is to peculiarly form the manifold associated with the valves so that the air stream may be uniformly divided and substantially continuous for directing air to the several cylinders of a motor and for similarly directing the exhaust gases from the cylinders to and from the manifold. Still other objects of invention may appear as the description progresses.

In the accompanying drawing I have shown two forms of an internal combustion engine embodying my invention, subject to modification, within the scope of the appended claims, without departing from the spirit thereof.

In said drawing:

Fig. 1 is a longitudinal section, in elevation, of a form of engine embodying my improvements;

Fig. 2 is a sectional elevation of the same on line 2—2 of Fig. 1;

Fig. 3 is a sectional plan of another form of engine, as seen on line 3—3 of Fig. 4; and Fig. 4 is a sectional elevation thereof on line 4—4 of Fig. 3.

The form of engine shown in Figs. 1 and 2 differs from the form shown in Figs. 3 and 4 only in that the valves in one case are arranged at the bottoms of the combustion chambers while in the other case said valves are arranged in the tops of said chambers, and certain differences in the form of the intake and exhaust manifold and the air passages are necessary to adapt the invention to the modified form.

Referring to Figs. 1 and 2, the engine shown is of conventional type and includes a cylinder block A, a detachable head B and a cover C secured to said head. A plurality of cylinders, as at D, are provided in the block A in which pistons E are reciprocably mounted and are adapted for operative connection with a crank shaft (not shown) by means of connecting rods F.

Head B is formed with a combustion chamber G associated with each of the cylinders D and in constant communication with the upper portion d of a cylinder by means of a passage g which is tangential to chamber G, said chamber being of cylindrical form. Ignition plugs H may be provided in the tops of the chambers G and fuel injectors I are preferably mounted slightly off center in the tops of the chambers G and are disposed at slight angles, as shown in Fig. 2, whereby fuel from a pump (not shown) may be supplied under pressure for mixture with air which is adapted to be compressed in the portions d of the cylinders, passages g and chambers G.

Valves J are reciprocably mounted in the bottoms of the chambers G and have their stems extended downwardly and slidable in suitable sleeves or guides of conventional form, there being but one of said valves for each chamber G and cylinder D through which air is supplied from the atmosphere to the cylinders for compression and the products of combustion are exhausted on the intake and exhaust strokes of pistons E, respectively.

Immediately below and extending longitudinally of block A at a side of the cylinders D I provide an air passage K which is substantially restricted in area and depth at points below the valves J by means of transverse ribs L, as shown in Fig. 1, whereby the air stream from an external source may be divided and directed upwardly on the intake cycles and the products of combustion similarly divided and directed outwardly from the valves on the exhaust cycles of operation.

Air at atmospheric pressure or suitable pressure thereabove is supplied to the passage K from a blower M such as is shown in Fig. 4, through a pipe N and a manifold O or otherwise. Said manifold is preferably bifurcated and connects with laterally formed passages P, P, while an exhaust manifold R is preferably trifurcated and connects with laterally formed passages S, S, and S.

Thus, on an intake cycle, the air stream enters through passages P, P, and is divided at their junctions with passage K so as to flow to the right and to the left from each passage P and the impingement of the air on the angular sides of the ribs L directs the air upwardly through valves J into chambers G and thence to cylinders D, in succession.

On the exhaust cycles of operation, the stream being constantly outwardly through the exhaust passages S, the products of combustion are directed downwardly and to the right and left and thence outwardly through passages S and manifold R.

In the form of engine shown in Figs. 3 and 4, block A, head B and cover C are of such slightly different form as to accommodate the engine to the reversal of the valves J, and chambers G and passages g are of substantially the same form and size as in Figs. 1 and 2. The intake and exhaust manifold arrangement is substantially different from the form shown in Figs. 1 and 2, particularly in that in the modified form the manifolds are horizontally disposed while in the first described form they are vertically disposed, with respect to the flow of the air stream therein.

Now, referring to Figs. 3 and 4, it will be noted that the ignition plugs H are arranged in the bottoms of the combustion chambers G while the valves J and fuel injectors I are mounted in the tops of said chambers or vice versa. The intake manifold O' and the exhaust manifold R' are arranged one in front of the other in a common plane, as shown in Fig. 3, with air inlets T, T, adapted for connection with the furcations of the intake manifold O' and intake passages P', P', leading, in each case, from said inlets to a pair of the valves J, J. Inlets T, T, are equally spaced from the valves J, J, and it will be noted that the passages P', P', are curved inwardly, as at V, V, from their central portions in the direction of the valves J, J, for the purpose of directing the air stream from the inlets to said valves.

Air is conducted through pipe N to and thence through a bifurcated portion N' which connects with the inlets T, T, as shown in Fig. 3. Exhaust manifold R' connects at U with a pipe U' by means of which the products of combustion are directed to a muffler, or otherwise are disposed of and passages S', S', lead to the right and left from outlet U and have curved extremities V', V', which communicate at the valves J, J, with the portions V, V, of manifold O'.

In the form of device just described, the air enters the inlets T, T, and is divided and flows in both directions to the innermost and outermost of the pairs of valves J and when the valves are opened, successively, the air enters the combustion chambers G through said valves and is compressed in the cylinders D. While the air is under compression the fuel is injected into the chambers G for mixture with the air and is ignited, either by compression or by means of the ignition plugs H, following which the pistons E move downwardly on their power strokes and on their succeeding upstrokes the products of combustion are exhausted through valves J and thence outwardly through the portions V' of the exhaust manifold to and from the outlet U.

It will be understood that the constant pressure of the air in passages P' serves to charge the cylinders with air from the atmosphere when valves J are open on the intake cycles and to force the products of combustion into and through passages V' when the exhaust valves are open. Thus, there is necessity for but a single valve for each of the cylinders D and a great many operating parts are eliminated and less opportunity for trouble in the operation of an engine is occasioned.

A central passage W communicates with the outlet U and with the passages P', P', so that the products of combustion from the innermost of the valves J are exhausted directly from said valves into said passage and thence outwardly through outlet U.

The particular form of manifold shown in Fig. 3 facilitates the evacuation of passages P' and S' when the gases are forcibly expelled through the central passage U inasmuch as the outward draft through said outward passage U will create suction in the passages P' and S'.

Also on the opening of any one of the valves J regardless of its position relative to the manifold the expulsion of the products of combustion through a valve will tend to create suction in the adjacent passages.

It will be observed that I have provided a simple, economical and effective engine of the internal combustion type, and what I claim is new and desire to secure by Letters Patent is:

1. An internal combustion engine comprising cylinders having ports serving for intaking air and exhausting products of combustion, air intake manifolds for supplying air to said ports, a plurality of exhaust manifolds having their intake terminals connected with said air intake manifolds and said ports and a common junctural portion for the discharge terminals of said exhaust manifolds, provided with an outlet serving each of and located adjacent to the discharge terminals of said exhaust manifolds.

2. An internal combustion engine comprising cylinders each having a single port serving for intaking and exhausting purposes, valves for said ports, and air intake manifolds common to said ports for supplying air thereto, a plurality of exhaust manifolds having their intake terminals joined with said air intake manifolds at points where the latter communicate with said ports and a common junctural portion connecting with the discharge ends of said exhaust manifolds and having a single outlet opening through which the exhaust gases are discharged.

FARLEY E. BECKETT.